United States Patent
Pong et al.

(10) Patent No.: US 6,253,291 B1
(45) Date of Patent: *Jun. 26, 2001

(54) METHOD AND APPARATUS FOR RELAXING THE FIFO ORDERING CONSTRAINT FOR MEMORY ACCESSES IN A MULTI-PROCESSOR ASYNCHRONOUS CACHE SYSTEM

(75) Inventors: Fong Pong, Mountain View; Rick C. Hetherington, Pleasanton, both of CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,534

(22) Filed: Feb. 13, 1998

(51) Int. Cl.[7] .................................................. G06F 12/00
(52) U.S. Cl. ............................................ 711/146; 711/147
(58) Field of Search .................................... 711/119, 122, 711/141, 146, 147, 148; 712/219, 216

(56) References Cited

U.S. PATENT DOCUMENTS

| | | | |
|---|---|---|---|
| 5,155,828 | 10/1992 | LaFetra et al. | 395/425 |
| 5,155,832 | 10/1992 | Hunt | 395/425 |
| 5,303,362 | 4/1994 | Butts, Jr. et al. | 395/425 |
| 5,369,753 | 11/1994 | Tipley | 395/425 |
| 5,386,547 | 1/1995 | Jouppi | 395/425 |

(List continued on next page.)

FOREIGN PATENT DOCUMENTS 0 481 233 A2  4/1992  (EP) ................ G06F/12/08

OTHER PUBLICATIONS

IBM Technical Disclosure Bulletin, Jan. 1998, vol. 30, No. 8, p. 33. "Vertical Partitioning in Cache Hierarchies".

Frailong, et al., "The Next–Generation SPARC Multiprocessing System Architecture" Proc. Of Spring Computer Society Intl. Conference, San Francisco, California USA, Feb. 22–26, 1993, Conf. 38, pp. 475–480.

Afek, et al., "A Lazy Cache Algorithm", AT&T Bell Laboratories, & Computer Science Department, Tel–Aviv University, School of Electrical Engineering, Cornell University, AT&T Bell Laboratories, pp. 209–223. (1989) ACM.

Brown, Geoffrey M., "Asynchronous Multicaches", Distributed Computing (1990), College of Electrical Engineering, Cornell University, pp. 31–36.

*Primary Examiner*—Kevin Verbrugge
(74) *Attorney, Agent, or Firm*—Thelen Reid & Priest LLP; David B. Ritchie

(57) ABSTRACT

According to the present invention, each processor in a multi-processor system separates locally generated processor requests and remote processor requests from the snoop queue into two categories. In the first category, are all coherence transactions, both read and write, generated by the local processor, as well as all coherence transactions generated by a remote processor which are write accesses. Each of the transactions in the first category maintain a strict FIFO structure wherein accesses to the cache are performed and retired. In the second category are all coherence transactions generated by a remote processor which are read accesses. In the second category of transactions, there are no order constraints between the transactions, with the exception that a transaction in the second category which references the same memory location as a transaction in the first category cannot be performed, if the transaction in the first category that was received before the transaction in the second category, and has not yet been completed. During this exception, the FIFO order must be maintained between the transaction in the first category and the transaction in the second category.

12 Claims, 4 Drawing Sheets

U.S. PATENT DOCUMENTS

| | | | |
|---|---|---|---|
| 5,398,325 | 3/1995 | Chang et al. | 395/425 |
| 5,432,918 | 7/1995 | Stamm | 395/425 |
| 5,524,233 | 6/1996 | Milburn et al. | 395/468 |
| 5,542,062 | 7/1996 | Taylor et al. | 395/403 |
| 5,564,035 | 10/1996 | Lai | 395/471 |
| 5,577,227 | 11/1996 | Finnell et al. | 395/449 |
| 5,581,725 | 12/1996 | Nakayama | 395/449 |
| 5,603,004 | 2/1997 | Kurpanek et al. | 395/445 |
| 5,613,083 * | 3/1997 | Glew et al. | 395/417 |
| 5,623,628 * | 4/1997 | Brayton et al. | 395/468 |
| 5,651,135 | 7/1997 | Hatakeyama | 395/455 |
| 5,652,859 * | 7/1997 | Mulla et al. | 395/473 |
| 5,657,291 | 8/1997 | Podlesny, et al. | 365/230.05 |
| 5,671,231 | 9/1997 | Cooper | 371/22.1 |
| 5,687,348 * | 11/1997 | Whittaker | 395/460 |
| 5,696,936 | 12/1997 | Church et al. | 395/465 |
| 5,717,890 | 2/1998 | Ichida et al. | 395/449 |
| 5,724,299 | 3/1998 | Podlesny et al. | 365/230.05 |
| 5,905,876 * | 5/1999 | Pawlowski et al. | 395/292 |

\* cited by examiner

METHOD AND APPARATUS FOR RELAXING THE FIFO ORDERING CONSTRAINT FOR MEMORY ACCESSES IN A MULTI-PROCESSOR ASYNCHRONOUS CACHE SYSTEM

BACKGROUND OF THE INVENTION

1. Field of the Invention

The present invention relates to memory models for microprocessor control. More particularly, the present invention relates to relaxing the first-in-first-out (FIFO) constraint on the processing of all snoop requests received from the system bus. Some concurrent processing of snoop requests is possible through the separation of locally generated requests from remotely generated requests, allowing selected requests to proceed without strict order constraints.

2. The Prior Art

In computer systems, memory access times often limit the throughput of the system. Relative to current processor speeds, data access times for the main memory can be quite long. One scheme to minimize this data access time limitation is to store some of the more frequently-used data in a location that is more quickly accessible to the processor than is the main memory. For example, in systems with multiple processors, a cache memory associated with each of the processors is used to store copies of certain data so that the data can be accessed more quickly than from the main memory. Cache memory generally has faster access times than does the main memory.

Unfortunately, cache memory systems are not without their own problems. Because the use of cache memory involves creating a copy of some of the main memory data, multiple copies of the same data may exist in different locations within the multi-processor computer system. When one copy of the data is changed, multiple copies of the same data held in other locations must also be updated. Data errors will occur within the multi-processor system if different processors within the system are operating (performing reads and writes) on such inconsistent copies of data. This problem is known as a cache consistency or cache coherence problem. To avoid this problem, a common solution is to maintain a total order for all memory accesses with the help of cache consistency protocols and hardware.

Hardware-based solutions to the cache coherence problem generally follow either a centralized or distributed approach. In a centralized approach, directory protocols maintain information about where copies of information reside in a centralized directory. The directory contains information about the contents of local caches for the entire multi-processor system. A centralized controller keeps this information up to date and interacts with all of the local caches to ensure that data consistency is maintained.

In a distributed approach, "snoopy" protocols distribute the responsibility for maintaining cache coherence among all of the processors. The updates each processor makes to a shared memory block must be broadcast to all other processors. Each cache controller "snoops", or reads, these broadcast messages and updates its own cache accordingly.

In the "snoopy" system, each individual processor and its cache is connected to a shared system bus that is connected to the shared main memory. As data operations are performed in each processor, the processor will broadcast these operations onto the shared system bus. For example, as a first processor performs read and write operations on shared data copies located in its cache, it broadcasts this information to the system bus to alert other processors to update the status of their data copies. By "snooping" the system bus, a second processor knows that it must invalidate its copy of a piece of data after it receives the broadcast that the first processor has operated on that same piece of data. Other examples of the messages broadcast by processors onto the shared system bus are well known to those of ordinary skill in the art.

In the asynchronous cache system 10 shown in FIG. 1, each processor 12-1 through 12-n has an associated cache 14-1 through 14-n and an associated first-in-first-out (FIFO) snoop buffer 16-1 through 16-n. Each snoop buffer 16-1 through 16-n is responsible for storing the snoop broadcasts received from the system bus 18 until they can be processed by each individual processor 12-1 through 12-n.

When a cache coherence transaction such as an invalidation is broadcast on the system bus 18, the invalidation request is buffered in each individual snoop buffer 16-1 through 16-n. The data selected for invalidation located in a cache 14 is not invalidated immediately. Instead, the broadcast messages are propagated separately following a FIFO order through each snoop buffer 16 to its associated cache 14. Accordingly, a copy of the data found in a cache 14 is invalidated independently or "asynchronously" of the invalidations occurring in other processor caches.

Total Store Ordering (TSO) and Sequential Consistency (SC) are two well-known techniques for specifying the order in which memory accesses are performed. SC and TSO do not allow any processors in the system to read two different write updates as having occurred in a different order. SC is a stronger model than TSO because SC also does not allow a processor to read and return the value of a write while the write is still pending in the buffer.

As an example of the type of errors TSO and SC prevent, suppose that the initial value of location X in the cache of a first processor is 0 and the initial value of location Y in the cache of a second processor is also 0. The first processor attempts to update location X to a value of 1 and the second processor attempts to update location Y to a value of 1. An illegal result occurs if a third processor reads X as 1 and Y as 0, while a fourth processor reads X as 0 and Y as 1. The third and fourth processors must read these two operations as having occurred in the same order.

It was normally believed that requests received from the system bus needed to be processed by the system processors in the order in which they were received according to the prior art constraints. If the processor has a hierarchical cache system with multiple levels of cache associated with each processor, a FIFO path from the system bus through each level of cache must be maintained. Thus, the system bus behaves as a reference point at which memory accesses are ordered. It provides the necessary information to guarantee that all processors will observe the same sequence of events, and it is impossible to observe two writes, for example, in different orders.

Maintaining this strict FIFO order does create a memory access time penalty. If a strict FIFO order is maintained on all coherence transactions, a pending request that may have a long memory access latency, for example a request to access the shared main memory which will take longer than a cache access, will penalize other transactions further down in the FIFO store path. The processor will pause and wait for the pending request to complete, wasting processor time that could be used to execute other requests if the FIFO restraint could be relaxed. Accordingly, a method for relaxing this FIFO constraint would be desirable. Such a method could reduce the amount of time an individual processor is idle while waiting for a request to complete, and thus reduce overall execution time for the multi-processor computer system.

BRIEF DESCRIPTION OF THE INVENTION

The present invention is a method for relaxing the first-in-first-out (FIFO) constraint on the processing of snoop requests received by local processors from the system bus and also requests generated locally within the processor itself. These snoop requests contain coherence transaction information designed to maintain consistency between the multiple memory data copies which may exist in various processors' local caches. The relaxation of this FIFO constraint allows certain snoop requests to be processed out-of-order without compromising the data coherence of the multi-processor system. The relaxation of this constraint allows for a more efficient utilization of processor resources in order to decrease the overall multi-processor system execution time.

In a preferred embodiment of the present invention, each processor in a multi-processor system separates locally generated processor requests and remote processor requests into from the snoop queue into two categories. In the first category, are all coherence transactions, both read and write, generated by the local processor, as well as all coherence transactions generated by a remote processor which are write accesses. Each of the transactions in the first category maintain a strict FIFO structure wherein accesses to the cache are performed and retired. In the second category are all coherence transactions generated by a remote processor which are read accesses. In the second category of transactions, there are no order constraints between the transactions, with the exception that a transaction in the second category which references the same memory location as a transaction in the first category cannot be performed, if the transaction in the first category that was received before the transaction in the second category, and has not yet been completed. During this exception, the FIFO order must be maintained between the transaction in the first category and the transaction in the second category.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

The present invention relates to a computer architecture for use in a multi-processor computer system. Each processor may have several caches associated with it, organized into a hierarchical structure. These caches can be located either on- or off-chip. On-chip caches tend to be smaller with faster access times, whereas off-chip caches tend to be larger with slower access times.

The cache with the fastest access time is referred to as the highest cache level, or the Level 1 cache. It is intended to hold the data that is most likely to be used frequently by the processor. The lower cache levels, Level 2 and/or Level 3, depending on the total number of caches each processor has, are generally slower than the Level 1 cache, but are able to hold more data. Thus a processor will first look for the data it needs in the Level 1 cache, then the Level 2 cache, and then the Level 3 cache. If the data is not found in any of the cache levels a cache miss will be broadcast to the system bus to locate the data either in another processor's cache or in the main memory.

The organization of the multiple caches can be either inclusive or non-inclusive. In an inclusive cache hierarchy, the lower level of the cache memory hierarchy is a superset of all of the upper levels. In a non-inclusive cache hierarchy, the lower level of the cache memory hierarchy does not necessarily contain the subsets of all upper levels of cache. Both inclusive and noninclusive cache hierarchies are contemplated by the present invention.

Figure 1:
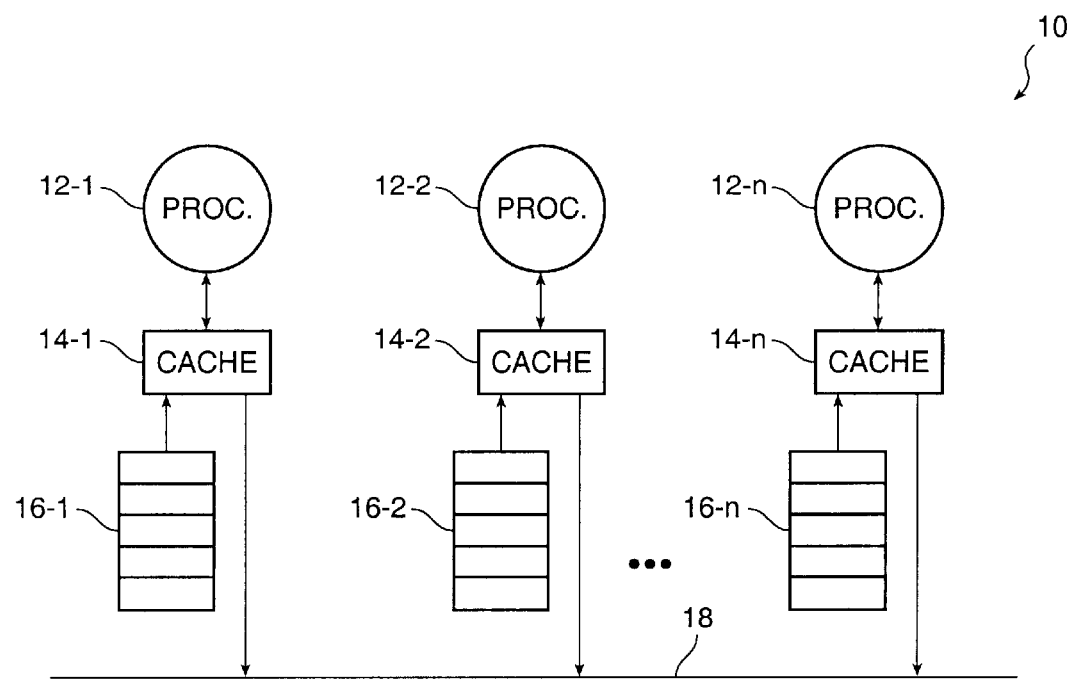
FIG. 1 is a block diagram of an asynchronous cache multi-processor system known in the art.
Figure 2:
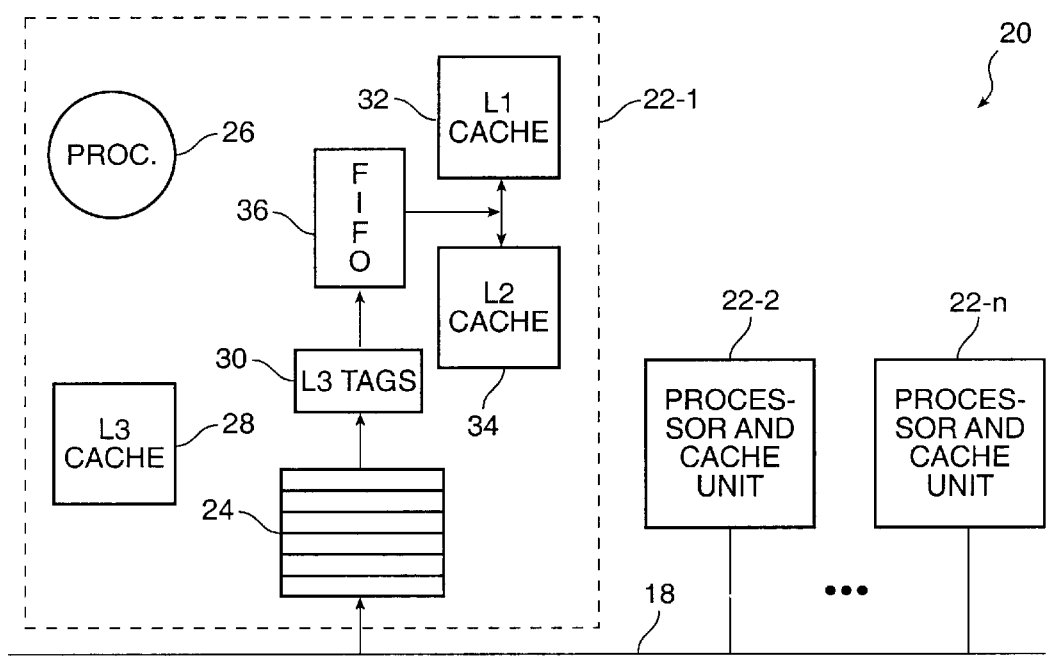
FIG. 2 is a block diagram of an inclusive asynchronous cache multi-processor system suitable for use according to the present invention.

An inclusive asynchronous cache system 20 suitable for use according to the present invention is shown in FIG. 2. The inclusive asynchronous cache system 20 is well known to those of ordinary skill in the art. Accordingly, to avoid overcomplicating the present disclosure and thereby obscuring the present invention, the disclosure of inclusive asynchronous cache system 20 is limited to the details needed to understand the present invention. The inclusive asynchronous cache system 20 is arranged as a plurality of processor and cache units 22-1 through 22-n. Each processor and cache unit 22 is connected to the system bus 18. The snoop queue 24 receives the snoop broadcasts off of the system bus 18 and moves them through the processor according to a FIFO scheme. In this example, each processor and cache unit 22 has 3 levels of cache associated with each processor 26. The Level 3 cache 28 is located off-chip and all of the Level 3 cache tags 30 are maintained on-chip to speed up access times. The Level 3 cache tags 30 contain only information about the addresses of the data contained in the actual Level 3 cache 28, and are used to filter out snoop requests that are actually applicable to data in the Level 3 cache 28.

The embodiment of the asynchronous cache system 20 shown in FIG. 2 is inclusive, and thus the Level 1 cache 32 and Level 2 cache 34 are subsets of the Level 3 cache 28. The Level 3 cache tags 30 can be used to filter out all inapplicable snoop traffic for all three levels of cache. Applicable snoop requests are stored in FIFO queue 36 for processing in Level 1 cache 32 or Level 2 cache 34. These requests are moved through the processor 24 according to a FIFO scheme.

Figure 3:
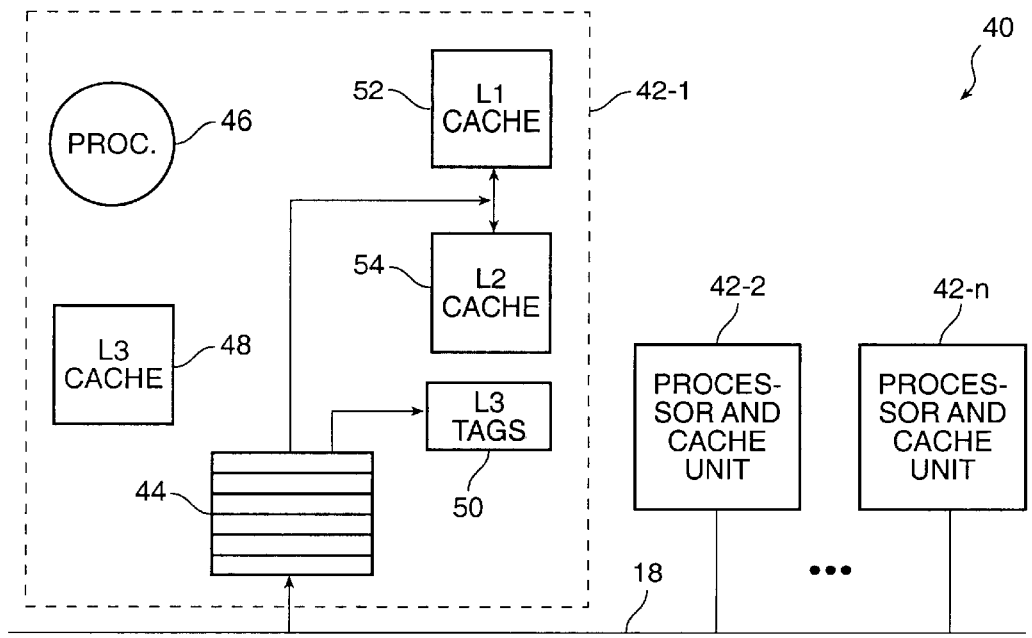
FIG. 3 is a block diagram of a first embodiment of a non-inclusive asynchronous cache multi-processor system suitable for use according to the present invention.

A non-inclusive asynchronous cache system 40 is shown in FIG. 3. The non-inclusive asynchronous cache system 40 is well known to those of ordinary skill in the art. Accordingly, to avoid overcomplicating the present disclosure and thereby obscuring the present invention, the disclosure of non-inclusive asynchronous cache system 40 is limited to the details needed to understand the present invention. The non-inclusive asynchronous cache system 40 is arranged as a plurality of processor and cache units 42-1 through 42-n. Each processor and cache unit 42 is connected to the 20 system bus 18. The snoop queue 44 receives the snoop broadcasts off of the system bus 18 and moves them through the processor 46 according to a FIFO scheme. In this example, each processor and cache unit 42 has 3 levels of cache associated with each processor 46. The Level 3 cache 48 is located off-chip and all of the Level 3 cache tags 50 are maintained on-chip to speed access times.

In the non-inclusive cache system 40, the Level 3 cache 48 is not a superset of the Level 1 cache 52 and the Level 2 cache 54. Thus snoop requests must be sent to the Level 3 cache tag 50 and to the Level 2 cache 54 to filter out the inapplicable snoop traffic, in the instance that the Level 2 cache 54 maintains inclusion of all Level 1 cache 50 data. As will be appreciated by those of ordinary skill in the art, if the Level 2 cache 48 does not maintain inclusion of all Level 1 cache 52 data, the snoop requests must also be sent to the Level 1 cache 52 because they would not be filtered out by the Level 2 cache 50. All snoop requests are moved through the processor 46 according to a FIFO scheme.

Figure 4:
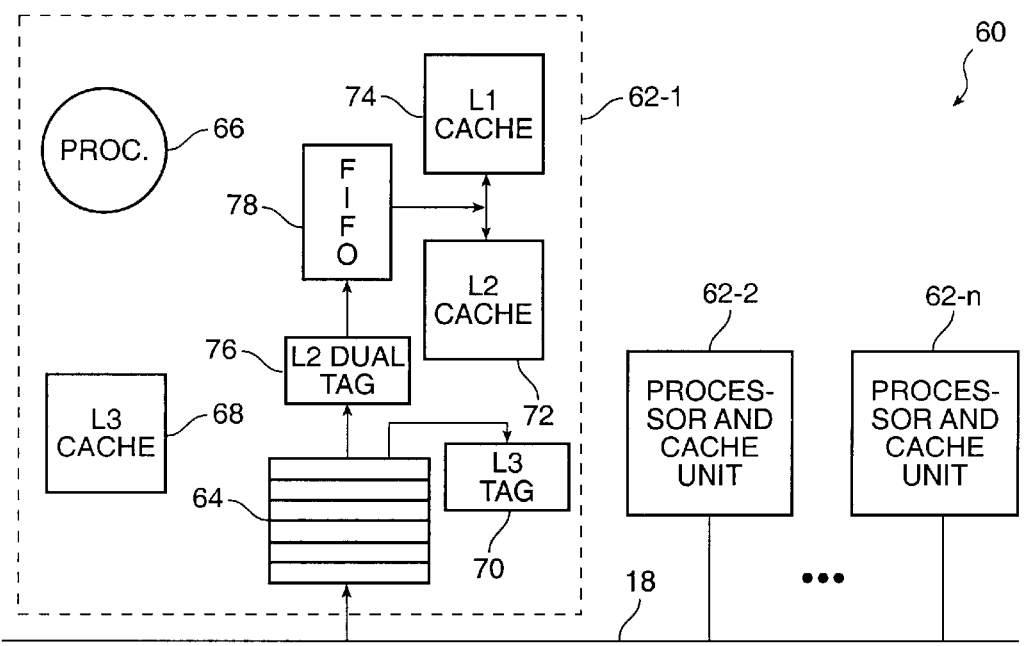
FIG. 4 is a block diagram of a second embodiment of a non-inclusive asynchronous cache multi-processor system suitable for use according to the present invention.

A presently preferred embodiment of a non-inclusive asynchronous cache system 60 suitable for use according to the present invention is illustrated in FIG. 4. To avoid overcomplicating the present disclosure and thereby obscuring the present invention, the disclosure of non-inclusive asynchronous cache system 60 is limited to the details needed to understand the present invention. A detailed disclosure of the asynchronous cache system 60 is made in co-pending application Ser. No. 08/940,217, now U.S. Pat. No. 6,073,212 filed Sep. 30, 1997, entitled "REDUCING BANDWIDTH AND AREAS NEEDED FOR NON-INCLUSIVE MEMORY HIERARCHY BY USING DUAL TAGS", by inventors Norman Hayes, Rick Hetherington, Belliappa Kuttanna, Fong Pong, and Krishna Thatipelli, and assigned to the assignee of the present invention and specifically incorporated herein by reference. The non-inclusive asynchronous cache system 60 is arranged as a plurality of processor and cache units 62-1 through 62-n. The snoop queue 64 receives the snoop broadcasts off of the system bus 18 and moves them through the processor 66 according to a FIFO scheme. In this example, each processor and cache unit 62 has 3 levels of cache associated with each processor 66. The Level 3 cache 68 is located off-chip and a duplicate copy of all of the Level 3 cache tags 70 is maintained on-chip to speed access times.

The Level 2 cache 72 maintains inclusion of all of the Level 1 cache 74 data. A Level 2 cache tag directory 76 is maintained for use in filtering snoop traffic directed to the Level 1 cache 74 and the Level 2 cache 72. Applicable snoop requests are stored in queue 78 for processing in the Level 1 cache 74 or the Level 2 cache 72. These requests are moved through the processor according to a FIFO scheme.

The present invention can be used in any of the asynchronous cache systems 20, 40, or 60 shown in FIGS. 2, 3, and 4, as well as in various modifications as will be appreciated by those of ordinary skill in the art. All of these asynchronous cache systems 20, 40, and 60 use a FIFO constraint on the processing of snoop traffic to ensure cache coherence. If a strict FIFO constraint is used to process all snoop requests, later requests that could be quickly processed will be delayed by earlier requests that take more time to process.

As an example of this delay, a first processor in one of the asynchronous cache systems 20, 40 or 60 initially has the most recent copy of the data for location A in its Level 2 cache. In the normal course of operations this first processor attempts a write to location B and has a miss in its cache system. This miss causes a block to be fetched from the memory. Meanwhile, a second processor attempts a read to location A, and a miss occurs. This miss prompts a request to the first processor for the most recent data copy in location A. If an internal FIFO path is maintained within the first processor, the read miss to location A by the second processor will not be fulfilled until to the long memory access latency caused by the first processor's miss to location B is finished.

The present invention solves the problem demonstrated above by separating the snoop requests directed to the Level 2 cache into two separate categories. The processor can then receive certain requests out of the order in which they were received by the snoop queue. This FIFO constraint relaxation allows the processor in certain cases to continue receiving and processing snoop requests instead of waiting for a single request to be completed. Decreasing the amount of time each individual processor is idle waiting for a request can decrease the execution time for the overall multi-processor system.

According to the present invention, in order to relax the FIFO constraint, and thereby decrease the execution time for the overall multi-processor system, each processor in the multi-processor system will separate locally generated processor requests and remote processor requests received from the snoop queue into two categories.

In the first category, are all coherence transactions, both read and write, generated by the local processor, as well as all coherence transactions generated by a remote processor which are write accesses. Each of the transactions in the first category maintain a strict FIFO structure wherein accesses to the cache are performed and retired. In the second category are all coherence transactions generated by a remote processor which are read accesses.

In the second category of transactions, there are no order constraints between the transactions, with the exception that a transaction in the second category which references the same memory location as a transaction in the first category cannot be performed, if the transaction in the first category that was received before the transaction in the second category, and has not yet been completed. During this exception, the FIFO order must be maintained between the transaction in the first category and the transaction in the second category.

Figure 5:
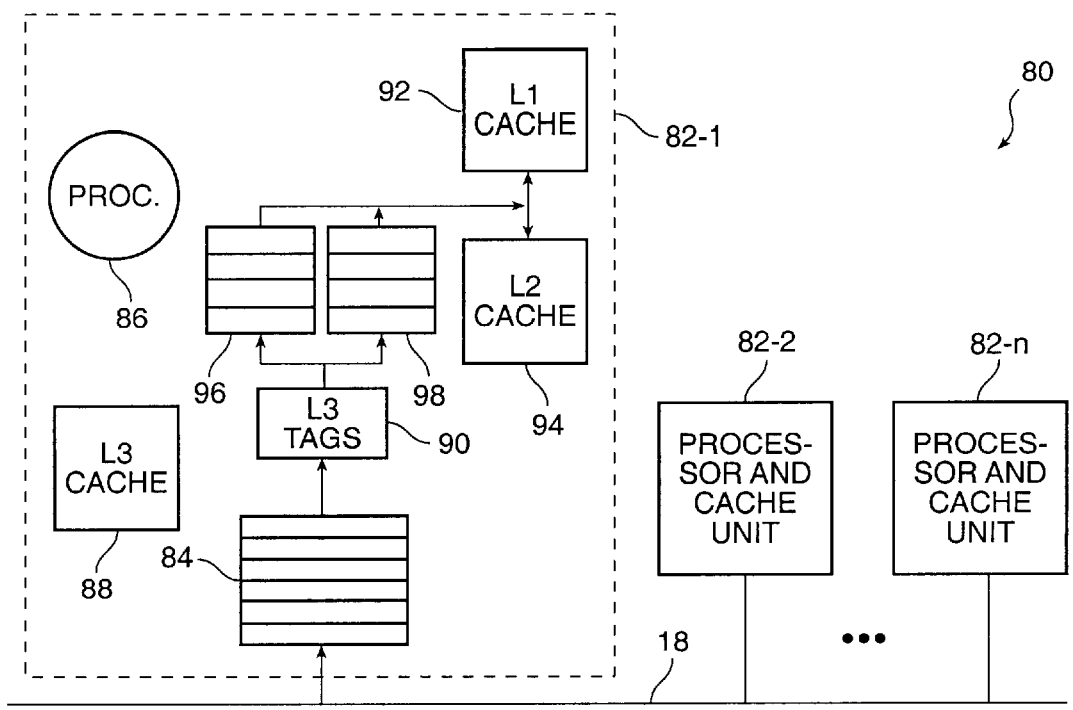
FIG. 5 is a block diagram of an inclusive asynchronous cache multi-processor system with the FIFO snoop queue constraint relaxed according to the present invention.

FIG. 5 shows the present invention implemented in an inclusive asynchronous cache system 80. The elements are similar to those described above in FIG. 2, except that the FIFO queue 36 of FIG. 2 has been replaced by a first category queue 96 and a second category queue 98

The inclusive asynchronous cache system 80 is arranged as a plurality of processor and cache units 82-1 through 82-n. Each processor and cache unit 82 is connected to the system bus 18. The snoop queue 84 receives the snoop broadcasts off of the system bus 18. In this example, each processor and cache unit 32 has 3 levels of cache associated with each processor 86. The Level 3 cache 88 is located off-chip and all of the Level 3 cache tags 90 are maintained on-chip to speed up access times. The Level 3 cache tags 90 contain only information about the addresses of the data contained in the actual Level 3 cache 88, and are used to filter out which snoop requests are actually applicable to data in the Level 3 cache 88.

The Level 1 cache 92 and Level 2 cache 94 are subsets of the Level 3 cache 88, and thus the Level 3 cache tags 90 can be used to filter out all inapplicable snoop traffic for all three levels of cache. First and second category queues 96 and 98, respectively, store the applicable snoop requests until they are processed in the Level 1 cache 92 and the Level 2 cache 94.

First category queue 96 receives all data coherence transactions generated by the local processor, as well as all coherence transactions generated by a remote processor which are write accesses. First category queue 96 maintains a strict FIFO order. Second category queue 98 receives all data coherence transactions generated by a remote processor which are read accesses. Second category queue 98 does not have any order constraints, and transactions in Second category queue 98 can normally be performed in any order. However, the exception for two transactions referencing the same address as described above applies. A transaction in second category queue 98 cannot be performed if there exists a transaction in first category queue 96 such that the transaction in first category queue 96 is received before the transaction in second category queue 96, and the transaction in first category queue 96 has not been retired. In this instance, the FIFO order must be maintained between the transaction in first category queue 96, and the transaction in second category queue 98.

Figure 6:
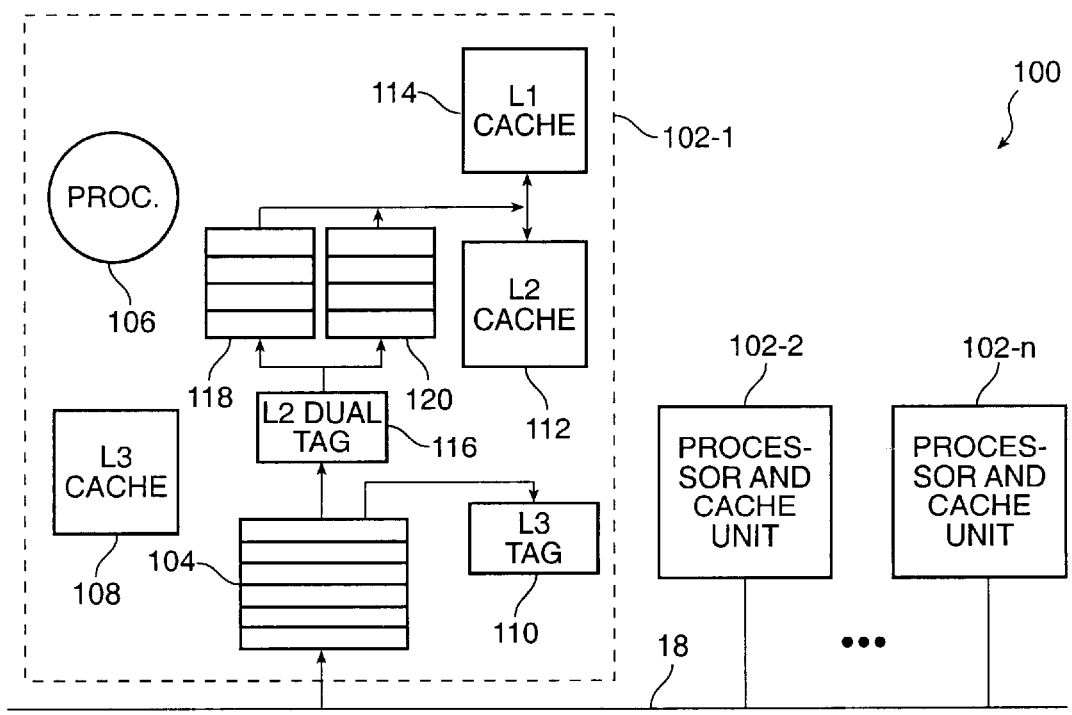
FIG. 6 is a block diagram of a non-inclusive asynchronous cache multi-processor system with the FIFO snoop queue constraint relaxed according to the present invention.

FIG. 6 shows a preferred embodiment of the present invention implemented in a non-inclusive asynchronous cache system 100. The elements are similar to those described above in FIG. 4, except that the FIFO queue 78 of FIG. 4 has been replaced by first category queue 118 and second category queue 120.

The non-inclusive asynchronous cache system 100 is arranged as a plurality of processor and cache units 102-1 through 102-n. Each processor and cache unit 102 is connected to the system bus 18. The snoop queue 104 receives the snoop broadcasts off of the system bus 18. In this example, each processor and cache unit 102 has 3 levels of cache associated with each processor 106. The Level 3 cache 108 is located off-chip and a duplicate copy of all of the Level 3 cache tags 110 is maintained on-chip to speed access times.

The Level 2 cache 112 maintains inclusion of all of the Level 1 cache 114 data. A duplicate of all of the Level 2 cache tags 116 is maintained for use in filtering snoop traffic. Applicable snoop requests are stored in first and second category queues 118 and 120, respectively for processing in the Level 1 cache 114 or the Level 2 cache 112.

First category queue 118 receives all data coherence transactions generated by the local processor, as well as all coherence transactions generated by a remote processor which are write accesses. First category queue 118 maintains a strict FIFO order. Second category queue 120 receives all data coherence transactions generated by a remote processor which are read accesses, which can be processed in any order, subject to the exception for two transactions referencing the same address described above.

It should be appreciated that the relaxation of the strict FIFO constraint for those transactions in the second category may be implemented in several ways. An alternative embodiment for relaxing the FIFO constraint is illustrated in FIG. 7.

Figure 7:
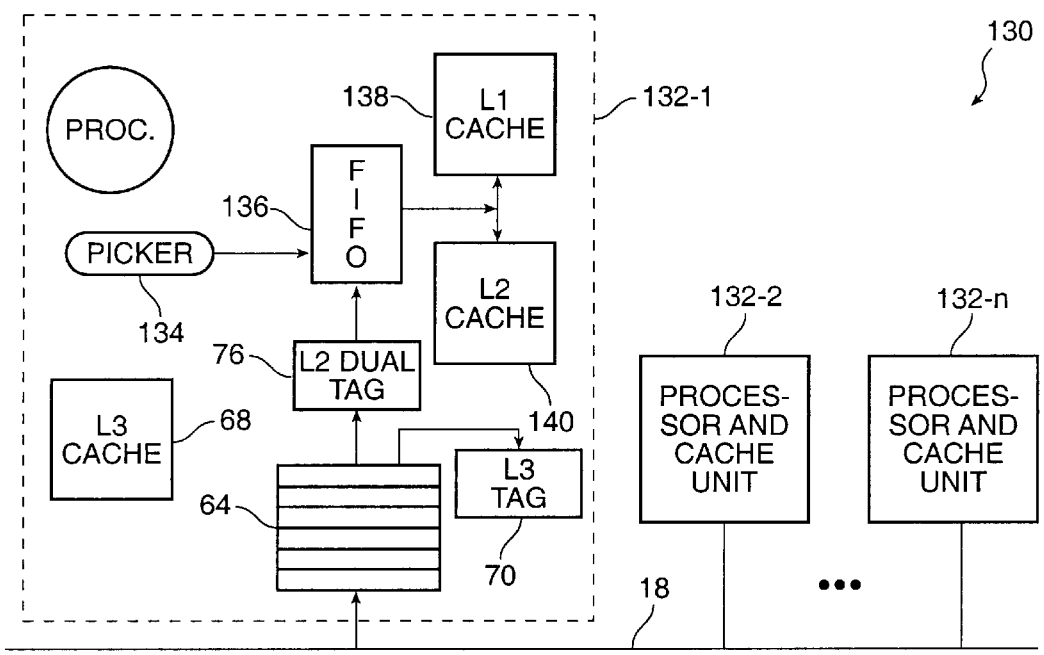
FIG. 7 is a block diagram of a non-inclusive asynchronous cache multi-processor system with the FIFO snoop queue constraint relaxed using a single queue and a picker element according to the present invention.

In the alternative embodiment illustrated in FIG. 7, the elements of the non-inclusive asynchronous cache system 130 and plurality of processor and cache units 132-1 through 132-n are the same as those shown in FIG. 4. However, also included is a picker 134. Unlike the embodiment illustrated in FIG. 6, wherein the queue 78 from FIG. 4 is broken into first and second category queues 118 and 120, in FIG. 7, a single queue 136 is employed to hold all of the data coherence transactions pending for the Level 1 cache 138 and the Level 2 cache 140. Transactions in queue 136 corresponding to the first category are processed in a FIFO order. The picker 134 is employed to select transactions for processing off of the queue 136 in the second category described above and which do not have to be processed in FIFO order, according to the rules discussed above. Any of several implementations of picker 134 according to the present invention is well within the abilities of those of ordinary skill in the art.

While illustrative embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for maintaining consistency between a plurality of copies of data which may exist in various locations in a computer system having an inclusive asynchronous memory architecture with a plurality of processors connected to a common system bus for processing requests that contain coherence transaction information, the method comprising:

maintaining a copy of all the data found in a plurality of caches associated with a local processor of a plurality of processors in one of the plurality of caches associated with the local processor;

receiving snoop requests from the plurality of processors other than local processor into a FIFO buffer associated with the local processor through the common system bus;

filtering out all snoop requests that are not related to the data associated with the local processor;

relaying related snoop read requests from the cache address tag directory to a first queue;

dispatching related snoop write requests from the cache address tag directory to a FIFO queue;

forwarding local processor requests to the FIFO queue; and processing all requests in the first queue with a processing constraint not to process a particular request stored in the first queue if any given request stored in the FIFO queue references the same memory location as does the particular request and the given request was received before the request in the first queue.

2. A method for maintaining consistency between a plurality of copies of data which may exist in various locations in a computer system having non-inclusive asynchronous memory architecture with a plurality of processors connected to a common system bus for processing requests that contain coherence transaction information, the method comprising:

storing data in a first, second and third cache, the caches associated with a local processor of the plurality of processors;

maintaining a copy of all the data found in the first cache in the second cache;

receiving snoop requests from the plurality of processors other than local processor into a FIFO buffer associated with the local processor and received through the common system bus;

filtering out all snoop requests that are not related to the data associated with the first and second caches;

relaying related snoop read requests from the cache address tag directory to a first queue;

dispatching related snoop write requests from the cache address tag directory to a FIFO queue;

forwarding local processor requests to the FIFO queue; and processing all requests in the first queue with a processing constraint not to process a particular request stored in the first queue if any given request stored in the FIFO queue references the same memory location as does the particular request and the given request was received before the request in the queue.

3. A method for maintaining consistency between a plurality of copies of data which may exist in various locations in a computer system having an inclusive asynchronous memory architecture with a plurality of processors connected to a common system bus for processing requests that contain coherence transaction information, the method comprising:

maintaining a copy of all the data found in a plurality of caches associated with a local processor of a plurality of processors in one of the plurality of caches associated with the local processor;

receiving snoop requests from the plurality of processors other than local processor into a FIFO buffer associated with the local processor through the common system bus;

filtering out all snoop requests that are not related to the data associated with the local processor;

relaying related snoop requests from the cache address tag directory to a FIFO queue;

forwarding local processor requests to the FIFO queue; and selecting snoop read requests off of the FIFO queue processing a selected snoop read request with a processing constraint not to process the selected snoop rear request if any given request stored in the FIFO queue references the same memory location as does the selected snoop read request and the given request was received before the selected snoop read request was received.

4. An inclusive asynchronous memory architecture for a computer system with a plurality of processors connected to a common system bus for processing requests that contain coherence transaction information for maintaining consistency among a plurality of memory data copies which may exist in various locations in the computer system, said computer system comprising:

a plurality of memory caches associated with a local processor of the plurality of processors, one of said plurality of memory caches including the data of all of said plurality of memory caches;

a snoop request FIFO buffer having an input and an output, said snoop request FIFO buffer associated with said local processor, the input of said snoop request FIFO buffer connected to the system bus to receive snoop requests from said plurality of processors other than said local processor;

a cache address tag directory of said one of said plurality of memory caches having an input and an output, the input of said cache address tag directory connected to the output of said snoop request FIFO buffer to filter out all snoop requests that are not related to data in said plurality of memory caches;

a FIFO queue having a FIFO queue input connected to said output of said cache address tag directory to receive local processor read requests, local processor write requests, and remote snoop data write requests, and having a FIFO queue output connected to said plurality of memory caches other than the one of said plurality of memory caches including the data of all of said plurality of memory caches;

a queue having a queue input connected to the output of said cache address tag directory to receive remote snoop data read requests and having a queue output connected to said plurality of memory caches other than the one of said plurality of memory caches including the data of all of said plurality of memory caches; and said local processor connected to said FIFO queue and said queue for processing the requests stored in both said FIFO queue and said queue and having a processing constraint not to process a particular request stored in said queue if any given request stored in said FIFO queue references the same memory location as does the particular request and the given request was received before the request in the queue.

5. A non-inclusive asynchronous memory architecture for a computer system with a plurality of processors connected to a common system bus for processing request that contain coherence transaction information for maintaining consistency among a plurality of memory data copies which may exist in various locations in the computer system, said computer system comprising:

first, second and third level memory caches associated with a local processor of said plurality of processors, said second level memory caches including the data of all of said first level memory caches;

a snoop request FIFO buffer having an input and an output, said snoop request FIFO buffer associated with said local processor, the input of said snoop request FIFO buffer connected to the system bus to receive snoop requests from said plurality of processors other than said local processor;

a third level memory cache address tag directory having an input connected to the output of said snoop request FIFO buffer;

a second level memory cache address tag directory having an input and an output, the input of said second level memory cache address tag directory connected to the output of said snoop request FIFO buffer to filter out all snoop requests that are not related to data in said first and second level memory caches;

a FIFO queue having a FIFO queue input connected to the output of said second level memory cache address tag directory to receive local processor read requests, local processor write requests and remote snoop data write requests and a FIFO queue output connected to said first and second level memory caches; and a queue having a queue input connected to the output of said second level cache memory address tag directory to receive remote snoop data read requests, and a queue output connected to said first and second level memory caches; and a local processor connected to said FIFO queue and said queue for processing the requests stored in both said FIFO queue and said queue and having a processing constraint not to process a particular request stored in said queue if any given request stored in said FIFO queue references the same memory location as does the particular request and the given request was received before the request in the queue.

6. An inclusive asynchronous memory architecture for a computer system with a plurality of processors connected to a common system bus for processing requests that contain coherence transaction information for maintaining consistency among a plurality of memory data copies which may exist in various locations in the computer system, said computer system comprising:

a plurality of memory caches associated with a local processor of said plurality of processors, one of said plurality of memory caches including the data of all of said plurality of memory caches;

a snoop request FIFO buffer having an input and an output, said snoop request FIFO buffer associated with said local processor, the input of said snoop request FIFO buffer connected to the system bus to receive snoop requests from said plurality of processors other than said local processor;

a cache address tag directory of said one of said plurality of memory caches having an input and an output, the input of said cache address tag directory connected to the output of said snoop request FIFO buffer to filter out all snoop requests that are not related to data in said plurality of memory caches;

a FIFO queue having an input and an output, the input of said first FIFO queue connected to the output of said second level cache address tag directory to receive snoop requests, the output of said FIFO queue connected to said plurality of memory caches other than the one of said plurality of memory caches including the data of all of said plurality of memory caches; and a selector to select snoop data read requests off of said FIFO queue that originate from said plurality of processors other than said local processor;

a local processor connected to said FIFO queue and said queue for processing the requests stored in both said FIFO queue and said queue and having a processing constraint not to process a particular request stored in said queue if any given request stored in said FIFO queue references the same memory location as does the particular request and the given request was received before the request in the queue.

7. A method for maintaining consistency between a plurality of copies of data which may exist in various locations in a computer system having an inclusive asynchronous memory architecture with a plurality of processors connected to a common system bus for processing requests that contain coherence transaction information, the method comprising:

means for maintaining a copy of all the data found in a plurality of caches associated with a local processor of a plurality of processors in one of the plurality of caches associated with the local processor;

means for receiving snoop requests from the plurality of processors other than local processor into a FIFO buffer associated with the local processor through the common system bus;

means for filtering out all snoop requests that are not related to the data associated with the local processor;

means for relaying related snoop read requests from the cache address tag directory to a first queue;

means for dispatching related snoop write requests from the cache address tag directory to a FIFO queue;

means for forwarding local processor requests to the FIFO queue; and means for processing all requests in the first queue with a processing constraint not to process a particular request stored in the first queue if any given request stored in the FIFO queue references the same memory location as does the particular request and the given request was received before the request in the first queue.

8. A method for maintaining consistency between a plurality of copies of data which may exist in various locations in a computer system having an non-inclusive asynchronous memory architecture with a plurality of processors connected to a common system bus for processing requests that contain coherence transaction information, the method comprising:

means for storing data in a first, second and third cache, the caches associated with a local processor of the plurality of processors;

means for maintaining a copy of all the data found in the first cache in the second cache;

means for receiving snoop requests from the plurality of processors other than local processor into a FIFO buffer associated with the local processor and received through the common system bus;

means for filtering out all snoop requests that are not related to the data associated with the first and second caches;

means for relaying related snoop read requests from the cache address tag directory to a first queue;

means for dispatching related snoop write requests from the cache address tag directory to a FIFO queue;

means for forwarding local processor requests to the FIFO queue;

means for processing all requests in the first queue with a processing constraint not to process a particular request stored in the first queue if any given request stored in the FIFO queue references the same memory location as does the particular request and the given request was received before the request in the queue.

9. A method for maintaining consistency between a plurality of copies of data which may exist in various locations in a computer system having an inclusive asynchronous memory architecture with a plurality of processors connected to a common system bus for processing requests that contain coherence transaction information, the method comprising:

means for maintaining a copy of all the data found in a plurality of caches associated with a local processor of a plurality of processors in one of the plurality of caches associated with the local processor;

means for receiving snoop requests from the plurality of processors other than local processor into a FIFO buffer associated with the local processor through the common system bus;

means for filtering out all snoop requests that are not related to the data associated with the local processor;

means for relaying related snoop requests from the cache address tag directory to a FIFO queue;

means for forwarding local processor requests to the FIFO queue; and means for selecting snoop read requests off of the FIFO queue means for processing a selected snoop read request with a processing constraint not to process the selected snoop read request if any given request stored in the FIFO queue references the same memory location as does the selected snoop read request and the given request was received before the selected snoop read request was received.

10. A program storage device readable by a machine, tangibly embodying a program of instructions executable by the machine to perform a method for maintaining consistency between a plurality of copies of data which may exist in various locations in a computer system having an inclusive asynchronous memory architecture with a plurality of processors connected to a common system bus for processing requests that contain coherence transaction information, the method comprising:

maintaining a copy of all the data found in a plurality of caches associated with a local processor of a plurality of processors in one of the plurality of caches associated with the local processor;

receiving snoop requests from the plurality of processors other than local processor into a FIFO buffer associated with the local processor through the common system bus;

filtering out all snoop requests that are not related to the data associated with the local processor;

relaying related snoop read requests from the cache address tag directory to a first queue;

dispatching related snoop write requests from the cache address tag directory to a FIFO queue;

forwarding local processor requests to the FIFO queue; and processing all requests in the first queue with a processing constraint not to process a particular request stored in the first queue if any given request stored in the FIFO queue references the same memory location as does the particular request and the given request was received before the request in the first queue.

11. A program storage device readable by a machine, tangibly embodying a program of instructions executable by the machine to perform a method for maintaining consistency between a plurality of copies of data which may exist in various locations in a computer system having an non-inclusive asynchronous memory architecture with a plurality of processors connected to a common system bus for processing requests that contain coherence transaction information, the method comprising:

storing data in a first, second and third cache, the caches associated with a local processor of the plurality of processors;

maintaining a copy of all the data found in the first cache in the second cache;

receiving snoop requests from the plurality of processors other than local processor into a FIFO buffer associated with the local processor and received through the common system bus;

filtering out all snoop requests that are not related to the data associated with the first and second caches;

relaying related snoop read requests from the cache address tag directory to a first queue;

dispatching related snoop write requests from the cache address tag directory to a FIFO queue;

forwarding local processor requests to the FIFO queue;

processing all requests in the first queue with a processing constraint not to process a particular request stored in the first queue if any given request stored in the FIFO queue references the same memory location as does the particular request and the given request was received before the request in the queue.

12. A program storage device readable by a machine, tangibly embodying a program of instructions executable by the machine to perform a method for maintaining consistency between a plurality of copies of data which may exist in various locations in a computer system having an inclusive asynchronous memory architecture with a plurality of processors connected to a common system bus for processing requests that contain coherence transaction information, the method comprising:

maintaining a copy of all the data found in a plurality of caches associated with a local processor of a plurality of processors in one of the plurality of caches associated with the local processor;

receiving snoop requests from the plurality of processors other than local processor into a FIFO buffer associated with the local processor through the common system bus;

filtering out all snoop requests that are not related to the data associated with the local processor;

relaying related snoop requests from the cache address tag directory to a FIFO queue;

forwarding local processor requests to the FIFO queue;

selecting snoop read requests off of the FIFO queue; and processing a selected snoop read request with a processing constraint not to process the selected snoop read request if any given request stored in the FIFO queue references the same.

* * * * *

UNITED STATES PATENT AND TRADEMARK OFFICE
CERTIFICATE OF CORRECTION

PATENT NO.  : 6,253,291 B1
DATED       : June 26, 2001
INVENTOR(S) : Fong Pong; Rick C. Hetherington Page 1 of 1

It is certified that error appears in the above-identified patent and that said Letters Patent is hereby corrected as shown below:

Column 4,
Line 30, replace "noninclusive" with -- non-inclusive --.
Line 61, replace "24" with -- 26 --.

Column 5,
Line 6, delete "20".

Column 6,
Line 10, delete "to".

Column 9,
Line 39, replace "rear" with -- read --.

Signed and Sealed this

Fifteenth Day of January, 2002

Attest:

JAMES E. ROGAN
Attesting Officer
Director of the United States Patent and Trademark Office